A. SCHINKEZ.
PERCUSSION TOOL.
APPLICATION FILED APR. 15, 1918.
1,309,815.
Patented July 15, 1919.
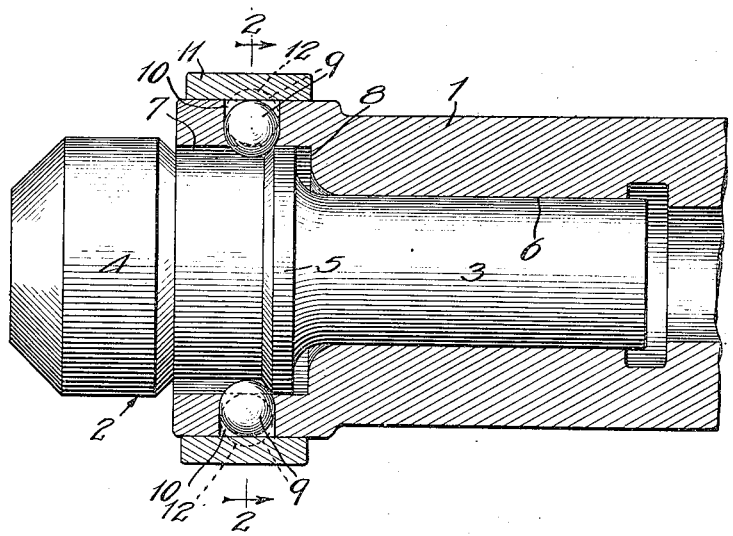
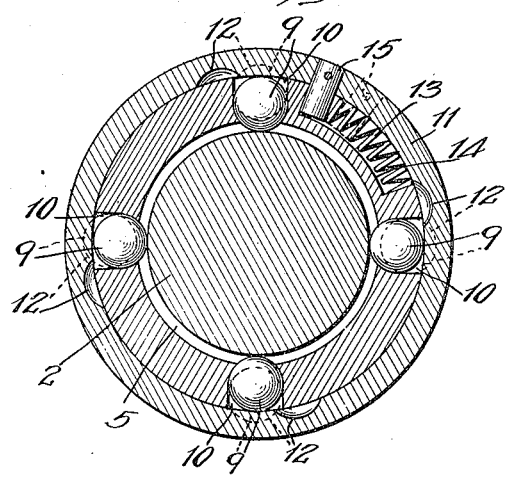
Witnesses:
W. F. Kilroy
Harry R. L. White
Inventor:
Albert Schinkez
By Miller Chindahl Parker
Attys

UNITED STATES PATENT OFFICE.

ALBERT SCHINKEZ, OF GRAND HAVEN, MICHIGAN, ASSIGNOR TO KELLER PNEUMATIC TOOL COMPANY, OF GRAND HAVEN, MICHIGAN, A CORPORATION OF MICHIGAN.

PERCUSSION-TOOL.

1,309,815.

Specification of Letters Patent.

Patented July 15, 1919.

Application filed April 15, 1918. Serial No. 228,600.

*To all whom it may concern:*

Be it known that I, ALBERT SCHINKEZ, a citizen of the United States, residing at Grand Haven, in the county of Ottawa and State of Michigan, have invented certain new and useful Improvements in Percussion-Tools, of which the following is a specification.

The invention relates to percussion tools and more particularly to rivet set retainers therefor; and the object of the invention is to provide a rivet set retainer of improved construction and arrangement which will effectively hold the rivet set in operative position in the tool body, but which is of a very simple and compact character.

The object of the invention thus generally stated together with other and ancillary advantages is attained by the construction and arrangement illustrated in the accompanying drawings forming part hereof in which Figure 1 is a central longitudinal sectional view through the forward end of a pneumatic hammer embodying the features of my invention. Fig. 2 is a transverse view taken on line 2—2 of Fig. 1.

In the drawings, 1 indicates the body of a pneumatic hammer having a rivet set 2 in its forward end. The hammer body may be of any preferred construction, and the rivet set comprises a shank 3, a head 4, and an intermediate peripheral flange or shoulder 5, the hammer body being provided with a bore 6 for the shank 3 and an enlarged cavity 7 for the head 4. The inward movement of the rivet set in the body is thus limited by the shoulder 5 engaging with an annular shoulder 8 formed by enlarging the bore 6 to form the cavity 7.

The retainer is adapted to limit the outward movement of the rivet set in the body and comprises a series of balls 9 entered in equidistantly spaced radial apertures 10 in the forward end of the body, and a retaining ring 11 for the balls fitting neatly upon the periphery of the body. The balls are made of a diameter slightly greater than the thickness of the portion of the body forming the cavity 7, and the inner ends of the apertures 10 are preferably shaped to form sockets for the balls but permitting a portion thereof to protrude inwardly into the path of movement of the shoulder 5 on the rivet set. Thus when said balls are held with their outermost surfaces flush with the periphery of the body, the forward side of the shoulder 5 will engage with the inwardly protruding portions of the balls to limit the outward movement of the rivet set.

Normally the ring 11 serves to hold the balls 9 in their innermost position, but means are provided for permitting them to be moved outwardly so as to allow the rivet set to be removed. To this end the inner surface of the ring 11 is provided with a plurality of recesses 12 corresponding in number to the number of balls 9 and adapted, when moved into register with the apertures 10, to receive the balls forced radially outwardly by the outward movement of the rivet set.

The means for normally holding the recesses 12 out of register with the apertures 10 preferably comprises a spring 13 mounted within an arcuate groove 14 in the body 1 and bearing between one end of the groove and a pin 15 carried by the ring 11 and projecting inwardly into the groove. The spring thus tends to hold the pin 15 against one end of the groove 14, and in this position of the parts the ring 11 is held in such position that the recesses 12 are out of register with the apertures 10. The pin 15 also serves to hold the retaining ring 11 against longitudinal movement on the body.

It will be apparent that when it is desired to insert or release the rivet set, it is only necessary to rotate the ring 11 against the action of the spring 13 to carry the recesses into register with the apertures 10, whereupon the rivet set may be moved relative to the body, the shoulder 5 thereon forcing the balls 9 into the recesses 12.

It will also be understood that I do not wish to be limited to the construction and arrangement set forth but that various changes may be made therein without departing from the spirit and scope of my invention.

I claim as my invention:

1. A percussion tool having, in combination, a barrel having an aperture therein, a rivet set operable in the barrel and having an annular shoulder thereon, a ring fitting neatly upon the body and having a recess therein, a ball entered in said aperture in the body and normally held by said ring in the path of movement of said annular shoulder on the rivet set, and a connection between said body and said ring adapted to prevent a longitudinal movement of the ring upon the body but permitting its circumferential movement thereon, the recess in the ring being disposed so as to be carried by circumferential movement of the ring into register with the aperture in the body whereby to permit of its movement out of the path of movement of the shoulder on the rivet set, said connection including a spring adapted to yieldingly hold said ring in its normal position upon the body.

2. A percussion tool having, in combination, a body, a rivet set operable in the body, a ring fitting neatly upon the body, and a ball mounted in the body and movable, when the ring is moved circumferentially of the body, either into or out of operative engagement with the rivet set, said ring having a pin-and-slot connection with the body permitting its circumferential movement thereon but preventing its longitudinal movement upon the body.

3. A percussion tool having, in combination, a body, a rivet set operable in the body, a ring fitting neatly upon the body, a ball mounted in the body and movable, when the ring is moved circumferentially of the body, either into or out of operative engagement with the rivet set, said body having an arcuate groove in its periphery and said ring having a pin entered in said groove adapted to permit the circumferential movement of the ring relative to the body but preventing its longitudinal movement thereon, and a spring entered in said groove and bearing against said pin to normally hold the ring in position to retain the ball in operative engagement with the rivet set.

In testimony whereof, I have hereunto set my hand.

ALBERT SCHINKEZ.